United States Patent [19]
Kenagy et al.

[11] Patent Number: 5,842,124
[45] Date of Patent: Nov. 24, 1998

[54] SYSTEM AND METHOD FOR USER-PROGRAMMABLE SERVICE PROGRAMMING OF CELLULAR TELEPHONES

[75] Inventors: Jason B. Kenagy, La Jolla, Calif.; Michael T. Coad, Overland Park, Kans.

[73] Assignee: Qualcomm Incorporated, San Diego, Calif.

[21] Appl. No.: 751,191

[22] Filed: Nov. 15, 1996

[51] Int. Cl.$^6$ ...................................................... H04Q 7/32
[52] U.S. Cl. .......................... 455/418; 455/411; 455/550; 455/551
[58] Field of Search ..................................... 455/410, 411, 455/418, 419, 550, 575, 551; 340/825.34

[56] References Cited

U.S. PATENT DOCUMENTS

| | | | |
|---|---|---|---|
| 5,297,191 | 3/1994 | Gerzberg | 379/59 |
| 5,551,073 | 8/1996 | Sammarco | 455/89 |
| 5,572,571 | 11/1996 | Shirai | 455/551 |
| 5,612,682 | 3/1997 | DeLuca et al. | 455/411 |

FOREIGN PATENT DOCUMENTS

9523487  8/1995  WIPO ............................... H04Q 7/22

*Primary Examiner*—Willis R. Wolfe
*Assistant Examiner*—Hieu T. Vo
*Attorney, Agent, or Firm*—Russell B. Miller; Charles D. Brown

[57] ABSTRACT

A system for user-programming of system parameters of a cellular telephone. Data values for the system parameters are stored in a nonvolatile memory within the cellular telephone. A password storage area stores one or more predetermined passwords. After purchasing the telephone, the end-user calls a predetermined telephone number and receives one of the predetermined passwords. The user enables a programming mode and enters the predetermined password using the cellular telephone keypad. If the user-entered password matches the stored predetermined password, the cellular telephone allows user access to at least a portion of the system parameters in the nonvolatile memory. A counter tracks the number of user-programming attempts and terminates the programming after either a predetermined number of failures or successful programming of all the desired system parameter values.

26 Claims, 6 Drawing Sheets

SYSTEM AND METHOD FOR USER-PROGRAMMABLE SERVICE PROGRAMMING OF CELLULAR TELEPHONES

BACKGROUND OF THE INVENTION

1. Field of the Invention

The present invention relates generally to cellular telephone operation, and more particularly, to a system and method that allows user programming of cellular telephone hand sets.

2. Description of the Related Art

Cellular telephones have become commonplace as an accepted replacement for conventional telephone systems. In countries such as the United States, a large infrastructure already exists for conventional telephone use. However, cellular telephones offer the convenience of portable communication from almost any location in the country. A party may call an individual cellular telephone using one telephone number, and contact that cellular telephone at any location throughout the world. The use of cellular telephones in a developed country offers the convenience of portable communications. In lesser developed countries where the conventional telephone infrastructure is minimal or nonexistent, cellular telephone technology offers the possibility of an extensive communication system without the need for an extensive corresponding infrastructure. For example, individual households can use a cellular telephone thus eliminating the need for a wire between a telephone switching network and each individual house. Therefore, it can be appreciated that cellular telephone technology will become even more widespread in the future.

Figure 1:
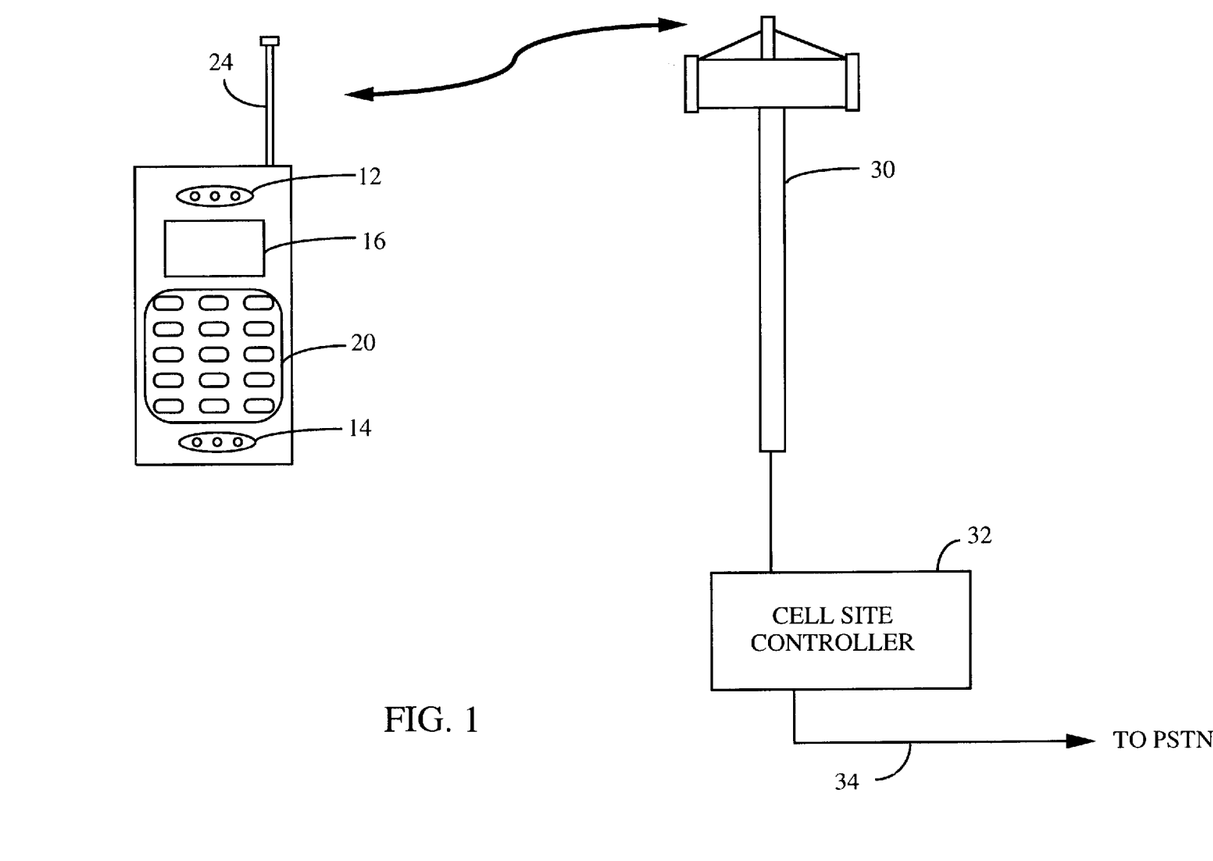
FIG. 1 illustrates the operation of a conventional cellular telephone with a cell site controller.

A conventional cellular telephone system is illustrated in the functional diagram of FIG. 1. A conventional cellular telephone 10 contains a speaker 12 and a microphone 14. A display 16, such as a liquid crystal display, is an optional feature included in most cellular telephones 10. However, some lower cost cellular telephones 10 do not include the display 16, but rather include status lights (not shown) to indicate the operational status of the cellular telephone 10 to the user. A keypad 20 is used to enter telephone numbers and perform other control functions for the cellular telephone 10. An antenna 24 on the cellular telephone 10 is coupled to an internal transceiver (not shown). Other conventional components of the cellular telephone 10, such as a battery, are omitted from FIG. 1 for the sake of clarity.

The antenna 24 provides a radio link between the cellular telephone 10 and a cell site antenna 30. Each cell site antenna 30 is coupled to a cell site controller 32, which controls communications between a telephone communications cell and the cellular telephone 10. The cell site controller 32 is coupled via a communications link 34 to conventional telephone connections, such as a telephone switching network, other cell site controller, or the like. The communications link 34 may be a direct land line, or a radio communications link, such as a microwave link, satellite link, or the like. It should be understood that there is one cell site antenna 30 and one cell site controller 32 for each telephone communications cell. In a particular geographic area, there may be a plurality of telephone communications cells (not shown). There are well known conventional techniques used to determine the particular telephone communications cell with which the cellular telephone 10 will communicate.

The cellular telephone 10 contains a number of operational parameters that must be entered to set up the cellular telephone prior to any communications between the cellular telephone and the cell site controller 32. Some data, such as an electronic serial number (ESN) are programmed into the cellular telephone 10 by the manufacturer at the time the cellular telephone is made. However, numerous other parameters are typically programmed by trained personnel at the point of sale, such as a cellular telephone store. Unfortunately, the requirement of extensive programming by trained personnel increases the cost of the cellular telephone by requiring a potential buyer to obtain the cellular telephone 10 at a specialty store. Thus, "off the shelf" purchases of cellular telephones are not feasible because the end-user is unable to complete the necessary programming steps to set up the cellular telephone for proper service within the user's geographic area.

Therefore, it can be appreciated that there is a significant need for a system and method that allows the end-user to program a cellular telephone without the need for extensive training or specialized equipment. The present invention provides this and other advantages as will be illustrated by the following description and accompanying figures.

SUMMARY OF THE INVENTION

The present invention is embodied in a system and method for user-programming of a wireless communications device for operation with a wireless service provider. The system comprises a data entry device operable by the user to enter data into the wireless communications device, such as a cellular telephone. A parameter storage area stores system operational parameter values to govern operation of the cellular telephone with the cellular service provider. The system operational parameters control communications between the cellular telephone and the cellular service provider. A password storage area stores a predetermined password. A password comparator compares password data entered by the user using the data entry device with the stored password. If the user-entered password matches the stored password, the password comparator permits user-programming of new system operational parameter values for storage in the parameter storage area.

The cellular telephone may include a display device to display instructions to the user to assist in user-programming of the new system operational parameter values. The cellular telephone also includes a transceiver to permit cellular communications between the cellular telephone and the cellular service provider. The transceiver can establish a cellular telephone communication with the cellular service provider using a predetermined telephone number and, if the user-entered password matches the stored password, the cellular service provider downloads at least some of the system operational parameter values during the cellular telephone communication with the remaining ones of the new system operational parameter values being entered into the cellular telephone by the user using the data entry device.

In one embodiment, the password storage area contains a plurality of passwords to permit varying degrees of user accessibility to data storage areas. The cellular telephone includes a data pointer to select one of the passwords with the password comparator permitting user-programming of new system operational parameter values for storage in the parameter storage area if the user-entered password matches the selected stored password.

The system operational parameters may include a mobile identification number and identification data related to the cellular service provider. The cellular telephone includes configuration data related to the attributes of the cellular telephone. The system operational parameters may include permanent mobile station indicators indicative of the configuration data. Other configuration data is related to the cellular telephone registration and lock. In this case, the system operational parameters may include semi-permanent mobile station indicators indicative of the configuration.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

As previously discussed, the cellular telephone 10 (see FIG. 1) contains a large number of parameters that control operation of the cellular telephone and its interaction with the cell site controller 32. Each of these parameters must be properly programmed prior to initial operation of the cellular telephone. If improperly programmed, the cellular telephone 10 will not operate satisfactorily and may not operate at all.

The present invention is directed to a system and method that allows the end-user to program the cellular telephone for proper operation in the user's geographic area. The cellular telephone of the present invention is capable of communicating with a cell site controller 32. In addition, the present invention may be readily incorporated into analog or digital cellular telephones or newer technology cellular telephones, such as a personal communications services (PCS) devices.

Figure 2:
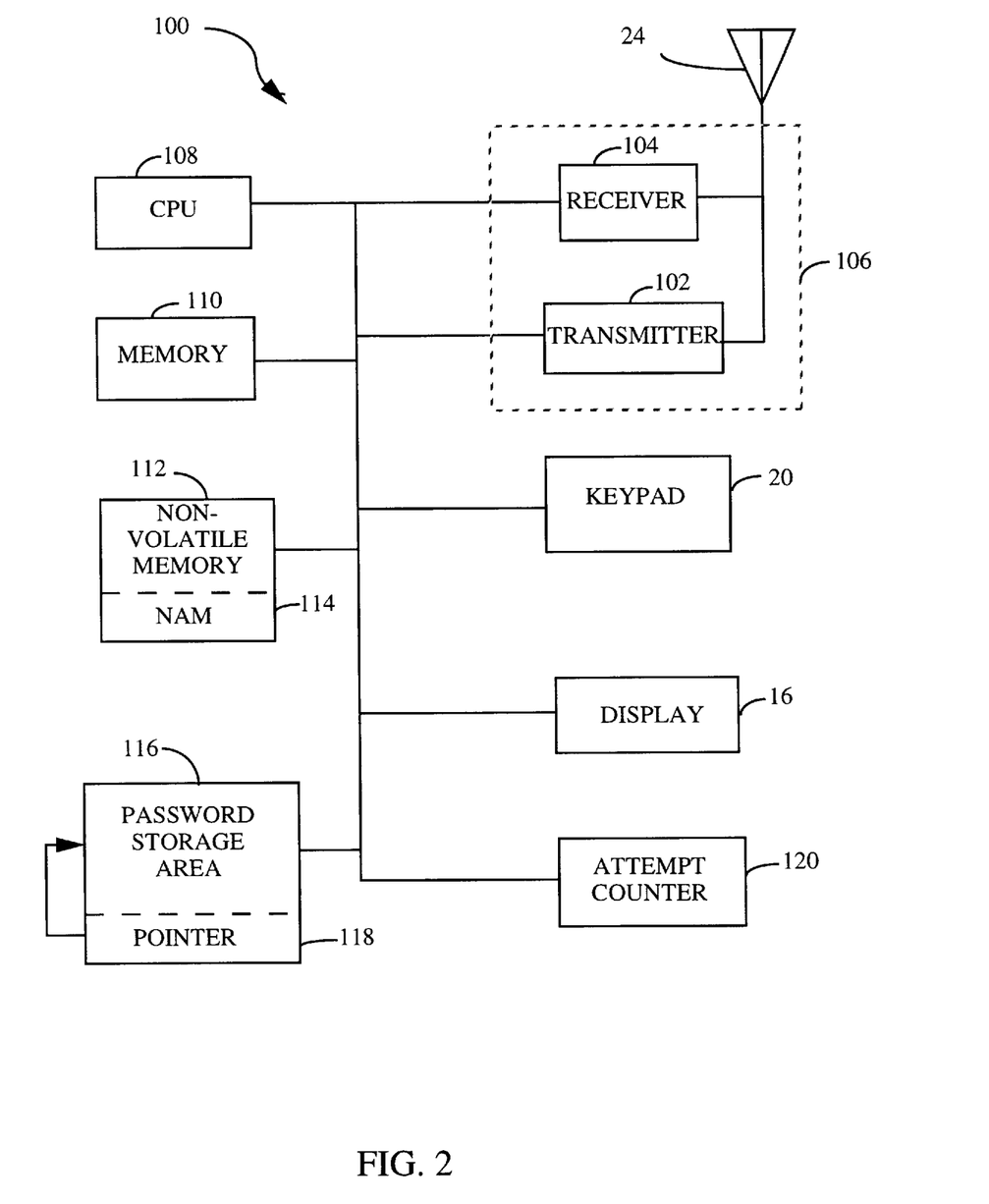
FIG. 2 is a functional block diagram of the present invention.

The present invention is embodied in a cellular telephone 100, illustrated in the functional block diagram of FIG. 2. The cellular telephone 100 includes many components found in the conventional cellular telephone 10 (see FIG. 1). For example, the cellular telephone 100 includes a display 16, keypad 20, and antenna 24. For the sake of clarity, other conventional components, such as the speaker 12, microphone 14, and battery (not shown) are omitted from FIG. 2. However, those of ordinary skill in the art will recognize that the cellular telephone 100 includes these conventional components. The cellular telephone 100 also includes a transmitter 102 and receiver 104 coupled to the antenna 24. The transmitter 102 is used to transmit voice and digital data from the cellular telephone 100 to the cell site controller 32 (see FIG. 1). The receiver 104 receives voice and data from the cell site controller 32. The transmitter 102 and receiver 104 may also be combined to form a transceiver 106.

The cellular telephone 100 also includes a central processing unit (CPU) 108, which may be a conventional microprocessor, microcontroller or the like. The cellular telephone 100 also includes a memory 110, which may include both read-only memory (ROM) and random access memory (RAM). Computer instructions within the ROM portion of the memory 110 are executed by the CPU 108 to control operation of the cellular telephone 100. Thus, instructions executed by the CPU 108 control normal operation of the cellular telephone 100 as well as the user-programming features of the present invention. The operation of the CPU 108 to control normal functions in the cellular telephone 100 are well known and need not be described herein. The operation of the CPU 108 to accomplish user-programming will be described in detail below.

A number of parameters are used to operate the cellular telephone 100. For purposes of the present invention, these parameters are divided into two different categories. A first category, defined herein as operational parameters, are entered by the user to control one or more specific cellular telephone calls. Examples of operational parameters are user-programmable features such as programmed telephone numbers, speed dialing features, call forwarding, and the like. It should be noted that most conventional cellular telephones 10 (see FIG. 1) include user-programmable operational parameters such as programmed telephone numbers.

A second category of parameters, defined herein as system parameters, are programmed into the cellular telephone 100 to control the communications between the cellular telephone and the cell site controller 32 (see FIG. 1). System parameters differ from operational parameters because they control all communications between the cellular telephone 100 and the cell site controller 32. Examples of system parameters include an electronic serial number (ESN) and a mobile identification number (MIN). The ESN and MIN are transmitted from the cellular telephone 100 to the cell site controller 32 (see FIG. 1) to identify the cellular telephone for billing purposes and to verify the authenticity of the cellular telephone.

Some system parameters are specific to the individual cellular telephone 100 and are never changed by the user. These parameters include permanent mobile station indicators that specify the physical configuration and attributes of the cellular telephone 100. Table 1 below is an excerpt from an industry standard TIA/EIA IS-95, entitled "Mobile Station—Base Station Compatibility Standard for Dual-Mode Wideband Spread Spectrum Cellular System," and defines permanent mobile station indicators.

TABLE 1

Permanent Mobile Station Indictors

| Indicator | Number of Bits | Where Defined | Notes |
|---|---|---|---|
| ESN | 32 | 2.3.2 | See 2.3.2 for special ESN storage and protection requirements. |
| $SCM_p$ | 8 | 2.3.3 | |
| $SLOT\_CYCLE\_INDEX_p$ | 3 | 6.3.11 | |
| $MOB\_P\_REV_p$ | 8 | 6.3.14 | |
| $MOB\_FIRM\_REV_p$ | 16 | 6.3.14 | |
| $MOB\_MODEL_p$ | 8 | 6.3.14 | |

Examples of permanent mobile station indicators shown in Table 1 include the ESN. As discussed above, the ESN is used as a billing/identification parameter because it is transmitted along with the MIN to identify the cellular telephone 100 and verify its authenticity. However, unlike the MIN, which can be changed, the ESN for the cellular telephone 100 never changes. Another example of a permanent mobile station indicator is a station class mark (SCM), which identify certain characteristics of the cellular telephone 100, such as the ability to support code division multiple access (CDMA) features or the ability to operate in dual modes such as CDMA/analog. Another example of permanent mobile station indicators is a slot cycle index, which indicates which of eight paging slots that the cellular telephone 100 will monitor in a slotted paging environment. Other permanent mobile station indicators include the protocol revision number, firmware revision number, manufacturer's model number, and the like. The permanent mobile station indicators are entered at the time of manufacture and never change.

In addition to the permanent mobile station indicators, the system parameters include semi-permanent mobile station indicators. The semi-permanent mobile station indicators, also defined in the industry standard IS-95, are shown below in Tables 2A and 2B. Table 2A defines the semi-permanent mobile station indicators for an analog version of the cellular telephone 100. Table 2B defines the semi-permanent mobile station indicators for a CDMA version of the cellular telephone 100.

TABLE 2A

Analog Semi-Permanent Mobile Station Indicators

| Indicator | Number of Bits | Where Defined | Notes |
|---|---|---|---|
| NXTREG$_{s-p}$ | 21 | 2.3.4.1 | |
| SID$_{s-p}$ | 15 | 2.3.4.1 | |
| LOCAID$_{s-p}$ | 12 | 2.3.4.2 | |
| PUREG$_{s-p}$ | 1 | 2.3.4.2 | |

TABLE 2B

CDMA Semi-Permanent Mobile Station Indicators

| Indicator | Number of Bits | Where Defined | Notes |
|---|---|---|---|
| ZONE_LIST$_{s-p}$ | | 6.3.4 | |
| REG_ZONE$_{s-p}$ | 12 | 6.3.4 | |
| SID$_{s-p}$ | 15 | 6.3.4 | |
| NID$_{s-p}$ | 16 | 6.3.4 | |
| SID_NID_LIST$_{s-p}$ | | 6.3.4 | |
| SID$_{s-p}$ | 15 | 6.3.4 | |
| NID$_{s-p}$ | 16 | 6.3.4 | |
| BASE_LAT_REG$_{s-p}$ | 22 | 6.3.4 | |
| BASE_LONG_REG$_{s-p}$ | 23 | 6.3.4 | |
| REG_DIST_REG$_{s-p}$ | 11 | 6.3.4 | |
| LCKRSN_P$_{s-p}$ | 4 | 6.3.13 | |
| MAINTRSN$_{s-p}$ | 4 | 6.3.13 | |

Another category of system parameters for the cellular telephone 100 are defined herein as user-programmable system parameters. The user-programmable system parameters are entered into the cellular telephone 100 at activation of service and are specific to the combination of the cellular telephone and the cell site controller 32 (see FIG. 1). The user-programmable system parameters are known in the industry as a number assignment module (NAM). The NAM parameters defined by the industry standard IS-95 are shown below in Table 3.

TABLE 3

NAM Indicators

| Indicator | Number of Bits | Where Defined | Notes |
|---|---|---|---|
| PREF-MODE$_p$ | optional | 2.3.10.2 | Preferred mode: analog or CDMA. Mobile station manufacturer option. |
| CDMA_PREF_SERV$_p$ | optional | 2.3.10.1 | Preferred CDMA serving system: A or B |
| ANALOG_PREF_SERV$_p$ | optional | 2.3.10.1 | Preferred analog serving system: A or B |
| FIRSTCHP$_p$ | 11 | 2.3.7 | |
| A_KEY | 64 | 2.3.12.1.8 | See TSB-50 "User Interface for Authentication Key Entry" for details of a A-KEY entry into the mobile station. |
| SSD-A$_{s-p}$ | 64 | 2.3.12.1.1 | Shared Secret Data A |
| SSD_B$_{s-p}$ | 64 | 2.3.12.1.1 | Shared Secret Data B |
| COUNT$_{s-p}$ | 6 | 2.3.12.1.3 | Call History Parameter |
| MIN1$_p$ | 24 | 2.3.1 | |
| MIN2$_p$ | 10 | 2.3.1 | |
| HOME_SID$_p$ | 15 | 2.3.8 | |
| SID_NID$_p$ | | 6.3.8 | |
| SID$_p$ | 15 | 6.3.8 | |
| NID$_p$ | 16 | 6.3.8 | |
| ACCOLC$_p$ | 4 | 2.3.5 | |
| Ex$_p$ | 1 | 2.3.6 | |
| MOB_TERM_HOME$_p$ | 1 | 6.3.8 | |
| MOB_TERM_FOR_SID$_p$ | 1 | 6.3.8 | |
| MOB_TERM_FOR_NID$_p$ | 1 | 6.3.8 | |

Examples of user-programmable system parameters are the cellular controller site identification (SID), preference mode, and the like. The HOME_SID, for example is used to identify the specific system that will be used as a home system for the cellular telephone 100. The preference mode is used to indicate whether the preferred operational mode for the cellular telephone 100 is, for example, analog or CDMA operation. In addition, parameters such as the MIN may be programmed by the user and may thus be considered to be a user-programmable system parameter. It should be noted that some NAM parameters may be pre-programmed in the cellular telephone and therefore need not be programmed by the end-user. Thus, the user-programmable system parameters may include some or all of the NAM parameters. The user-programmable system parameters may also include some semi-permanent system parameters. The term user-programmable system parameters is intended to encompass all nonpermanent system parameters.

A nonvolatile memory 112 is used in the cellular telephone 100 to store parameter values. The nonvolatile memory 112 can store parameter values for both operational parameters and system parameters. That is, the nonvolatile memory 112 can store user-programmable operational parameters, permanent system parameters, semi-permanent system parameters, and user-programmable system parameters. A portion of the nonvolatile memory 112 is designated as a NAM storage area 114. The NAM storage area 114 may contain some of the billing/identification parameters as well as the user-programmable system parameters. The NAM storage area 114 must be correctly programmed for operation with the cell site controller 32 (see FIG. 1). While the conventional cellular telephone 10 (see FIG. 1) permits programming of the nonvolatile memory 112 for user-programmable operational parameters such as programmed telephone numbers, the cellular telephone 100 permits user-programming of the NAM storage area 114, which is not normally accessible to the end-user, but rather is generally only accessible to the manufacturer and to point-of-sale service technicians. Thus, the present invention is directed to end-user programming of the NAM storage area 114 and not end-user programming of conventional features such as destination telephone numbers.

Figure 3:
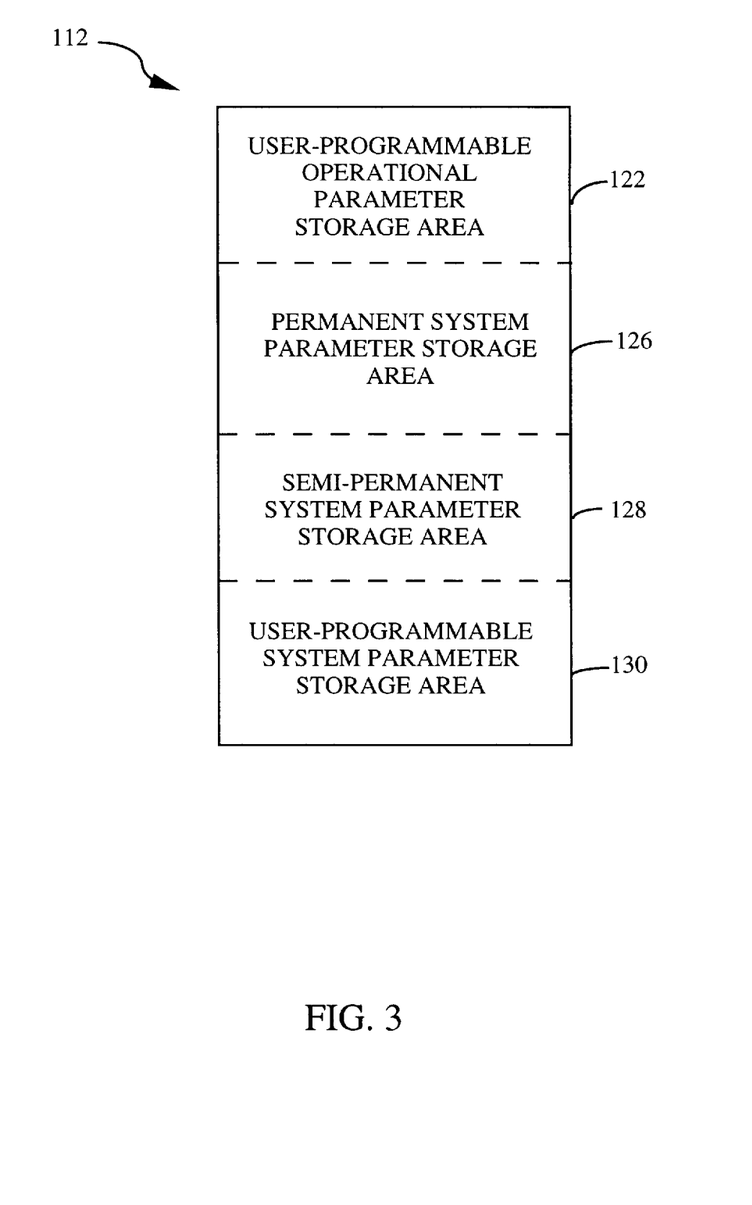
FIG. 3 provides details of the data storage area used by the system of FIG. 2.

Details of the storage areas of the nonvolatile memory 112 are illustrated in FIG. 3. For purposes of the present invention, the nonvolatile memory 112 may be divided into multiple portions, each of which may store data programmed into the cellular telephone 100 by the end-user. A user-programmable operational parameter storage area 122 includes conventional features such as destination telephone numbers, speed dialing features, and the like. As previously discussed, data stored in the user-programmable operational parameter storage area 122 may be optionally entered by the user and is well known in the art.

The nonvolatile memory 112 also includes a permanent system parameter storage area 126. The permanent system parameter storage area 126 stores parameter values for the permanent mobile station indicators of Table 1. A semi-permanent system parameter storage area 128 stores parameter values for the semi-permanent mobile station indicators of Tables 2A and 2B. A user-programmable system parameter storage area 130 contains parameter values that can be selected by the end-user. This includes parameter values for the NAM storage area 114 shown in Table 3.

Data values for parameters illustrated in Table 3 above are stored in the user-programmable system operational parameter storage area 130. In a preferred embodiment, the parameter values in the permanent system parameter storage area 126 and the semi-permanent system parameter storage area 128 are preprogrammed at the time of manufacture and are not accessible to the user. The remaining system parameters, stored in the user-programmable system operational parameter storage area 130, are user-programmable. In an alternative embodiment, all system parameters, including the permanent system parameters and semi-permanent system parameter values, may be user-programmable.

In operation, the user purchases the cellular telephone 100 at a specialty store, such as a cellular telephone store, or as an off-the-shelf item from any general purpose retail outlet. The cellular telephone 124 may be preprogrammed with default values for all system parameters, including the parameters stored in the semi-permanent system parameter storage area 128 and the user-programmable system parameter storage area 130. Alternatively, the user-programmable system parameter storage area 130 may initially be unprogrammed.

The end-user programming of the user-programmable system parameter storage area 130 is accomplished using a password stored in a password storage area 116. The password storage area 116 may be a separate storage area, or part of the nonvolatile memory 112. The password storage area 116 contains one or more passwords that are programmed into the cellular telephone 100 at the time of manufacture. Each of the individual passwords in the password storage area 116 may be used one or more times by the end-user to program the NAM storage area 114. A pointer 118 is used by the cellular telephone 100 to locate each of the passwords in the password storage area 116. The different passwords may each correspond to a different storage area or correspond to varying levels of programming access with a first password permitting user access only to the user-programmable system parameter storage area 130 while a second password may permit user access to the semi-permanent system parameter storage area 128 in addition to the user-programmable system parameter storage area.

As stated above, some semi-permanent system parameters and NAM parameters may be preprogrammed in the cellular telephone 100. To assure proper programming of the remaining parameters, the cellular telephone 100 includes an attempt counter 120, which is programmed with a value N corresponding to the number of attempts, per password, that the user is given to program the parameters. Each time the user unsuccessfully attempts to program the parameters, the CPU 108 decrements the count in the attempt counter 120, and may display an error message on the display 16 indicating to the user that a programming error occurred. When the value in the attempt counter 120 reaches zero, the CPU 108 terminates the programming process. If the user has successfully programmed all required parameters, the CPU 108 will set the attempt counter 120 to zero, and may further display a confirmation message on the display 16 indicating that all necessary parameters have been programmed. Thus, the user may be informed whether the programming attempt has been successful or not. If the programming attempt is unsuccessful, meaning that each of the N attempts per password have failed, the user may contact a service representative for additional instructions, or take the cellular telephone 100 to a local service center. Thus, the user is granted N times the number of passwords opportunities to successfully complete the programming. Preferably, this is accomplished when either N is more than one and there is one password, or N is one and there are more than one passwords.

To program the cellular telephone 100, the user calls a designated telephone number, such as a toll-free telephone number. A technician, or other representative of the cellular service provider, uses an identification number provided with the cellular telephone 100 to look up the first password associated with the particular cellular telephone. Alternatively, the password could be obtain from the packaging materials of the cellular telephone 100 or from the retail clerk upon presentation of a credit card number. Other means for providing the password to the user may be used without departing from the spirit of the present invention. The end-user enters a programming mode by entering an appropriate sequence of keystrokes on the keypad 20. In the programming mode, the user enters the password using the keypad 20. The CPU 108 compares the user-entered password with the first password stored in the password storage area 116. If the password entered by the user matches the stored password in the password storage area 116, the cellular telephone 100 permits access to the user-programmable system parameter storage area 130. The user subsequently completes the programming process by selecting the desired values for the user-programmable system parameters. The CPU 108 senses the user entry of data on the keypad 20 and stores the data in the appropriate portion of the user-programmable system parameter storage area 130. When each parameter is successfully programmed, the CPU 108 decrements the attempt counter 120 to zero.

The cellular telephone 100 simplifies user-programming for two reasons. First, many of the semi-permanent system parameters and NAM parameters can be preprogrammed at the time of manufacture of the cellular telephone 100.

Second, the cellular telephone 100 can utilize user-programmed parameters to automatically program other related parameters. For example, the selection of a home system ID number (HOME_SID$_p$) permits the cellular telephone 100 to automatically program values for the activation of secondary numbers such as MIN2 of Table 3, which generally corresponds to the area code. In another example of related parameter programming, the MIN entered by the user may be used to identify the country and automatically select the carrier system ID using, for example, a look-up table (not shown) containing a list of various service providers in the country. Thus, the user need only program a few parameter values in the cellular telephone 100 to complete the programming process.

Most selections of the user-programmable system operational parameters are self-explanatory to the user. Brief instructions to guide the user in the appropriate selection of parameters may be shown on the display 16. Alternatively, a user's manual that accompanies the cellular telephone 100 can also provide additional guidance in programming the cellular telephone. This may be particularly useful in cellular telephones that do not include the display 16 or have a limited display size. In yet another alternative, the cellular service provider representative may also guide the user in the programming process. Upon completion of the programming, all user selected values are permanently stored in the user-programmable system parameter storage area 130 of the nonvolatile memory 112. To reprogram the cellular telephone 100 at a subsequent time, the user must again contact the designated telephone number and obtain the appropriate password from the service provider representative.

In an alternative embodiment, the user may contact the designated service number using the cellular telephone 100. In this embodiment, the cellular telephone 100 is preprogrammed with selected default values for the NAM storage area 114. The end-user places the call to the designated telephone, number using the cellular telephone 100 and enters the password provided by the service provider representative and programs the cellular telephone in the manner described above. In this embodiment, the actual data values for the user-programmable system parameters are not entered into the user-programmable system parameter storage area 130 until the telephone call to the designated number is terminated. In this manner, the cellular telephone call to the designated number will not be affected by changes to the user-programmable system parameter storage area 130. The attempt counter 120 operates in the manner previously described. This embodiment offers the convenience of one telephone operation, but offers the same advantage of end-user selection of user-programmable system operational parameters.

In yet another alternative embodiment, at least some of the system parameter values can be downloaded automatically from the cell site controller 32 during a cellular telephone call for subsequent storage in the user-programmable system operational parameter storage area 130. In this embodiment, the cellular telephone 100 is preprogrammed with default values for the NAM storage area 114. The end-user calls the designated telephone number using the cellular telephone 100 and enters the password provided by the service provider representative in the manner described above. If the CPU 108 determines that the number entered by the user matches the stored password in the password storage area 116, the cellular telephone 100 can automatically accept data downloaded from the cell site controller 32.

Downloaded data can include data values for both the permanent system parameter storage area 126 and semi-permanent system parameter storage area 128 as well as the user-programmable system parameter storage area 130. For example, the cell site controller 32 may automatically download secondary identification numbers for cell service carriers neighboring the service carrier identified by the home system identification (HOME_SID$_p$). The user may manually enter additional data into the user-programmable system parameter storage area 130 in the manner described above. Alternatively, the user can respond to questions from the service provider representative regarding user preferences for the cellular telephone 100. In response to the preferences provided by the user, the cell site controller 32 can program part or all of the user-programmable system parameter storage area 130. Furthermore, the user may manually enter user preferences in the user-programmable system parameter storage area 130 or answer questions that permit the cellular service provider representative to generate data for automatic downloading to the user-programmable system parameter storage area.

Each of the embodiments described above simplifies the process of activating the cellular telephone 100. This is particularly advantageous for low cost off the shelf cellular telephones and greatly increases the accessibility of cellular telephones to individuals. The cellular telephone 100 may be readily programmed in accordance with user preferences. The cellular telephone 100 may also be readily reprogrammed if necessary. For example, if the end-user moves to a new location, reprogramming of the cellular telephone 100 may be required. The cellular telephone 100 may also be reprogrammed if the end-user also wishes to change some user preferences.

The password system of the cellular telephone 100 limits accessibility to the user-programmable system parameter storage area 130 thus preventing inadvertent reprogramming of the cellular telephone. In addition, the password system of the cellular telephone 100 provides added security in the event the cellular telephone is lost or stolen. If the cellular telephone 100 is lost or stolen, the user can report the loss to the cellular service provider which, in turn, prevents future communications with the cellular telephone 100. The person using the lost or stolen cellular telephone 100 will be unable to communicate with the cell site controller 32 and will further be unable to reprogram the cellular telephone with different system parameters, such as a different ESN/MIN in the nonvolatile memory 112. Thus, the password system of the cellular telephone 100 provides a deterrent to theft of the cellular telephone 100.

Alternatively, the password storage area 116 may store a pseudorandom number seed to generate a plurality of passwords using a conventional pseudo-random number generating algorithm. The seed could also be based on the ESN. The use of the password generating algorithm can reduce the amount of memory required by the cellular telephone 100. This is especially advantageous if a large number of passwords are used by the cellular telephone 100. The pseudo-random number generating algorithm uses the programmed seed to generate a series of passwords known only to the service provider. When the user calls the designated telephone number to contact the cellular service provider, as described above, the user is provided with a password that takes into account the number of passwords previously generated by the pseudo-random number generating algorithm. The password supplied by the service provider is entered into the cellular telephone 100 in the manner described above. The user-entered password must match the password generated by the pseudo-random number generating algorithm. Programming of the cellular telephone occurs in the manner described above. Other techniques such as public/private encryption keys and the like may also be used to generate one or more passwords within the cellular telephone 100. No matter what technique is used to generate a password, the cellular telephone 100 compares a stored password with the user-entered password to control access to the user-programmable system parameter storage area 130.

Figure 4A:
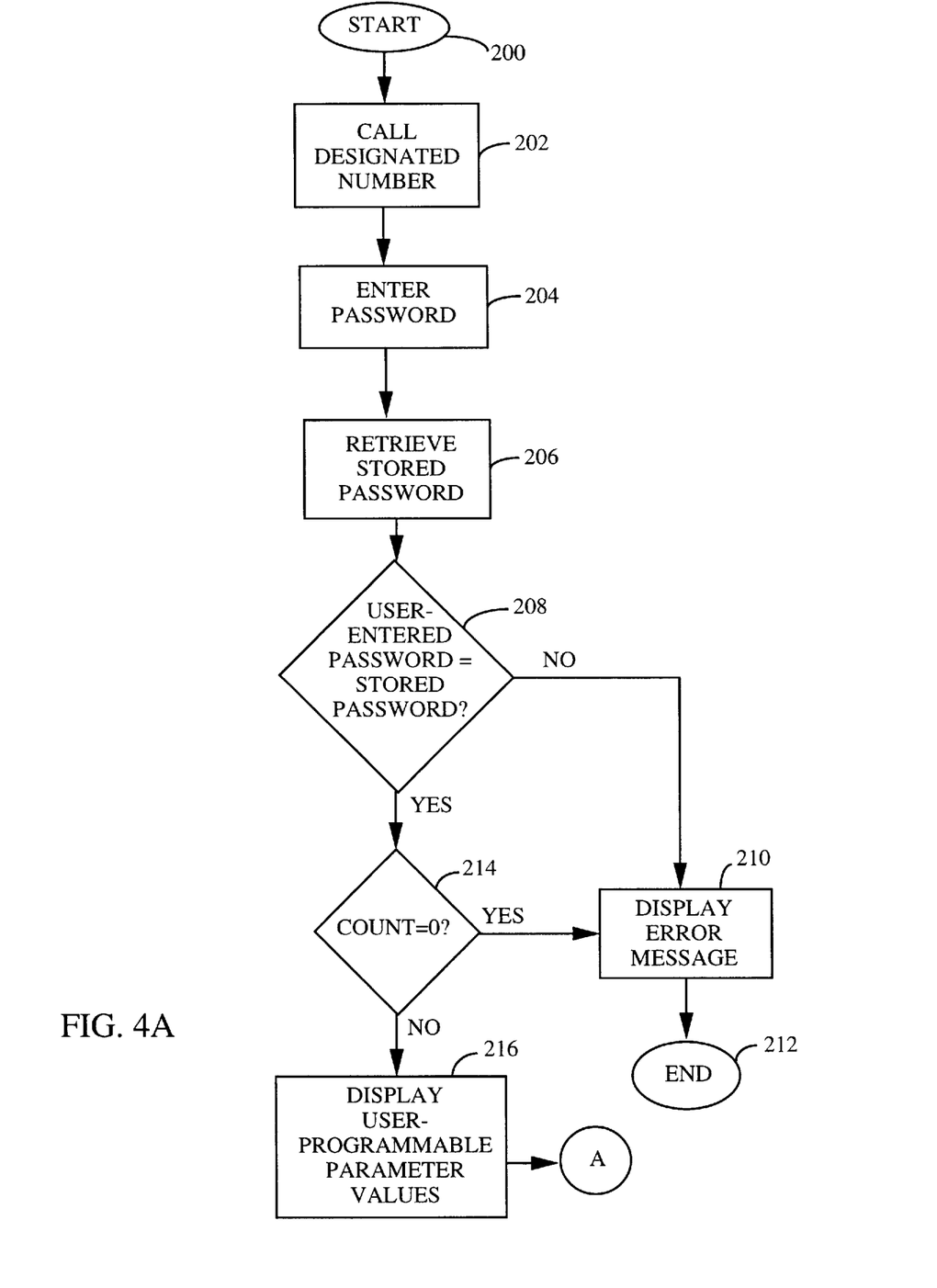
FIGS. 4A and 4B together are a flowchart of the operation of the cellular telephone of FIG. 2.
Figure 4B:
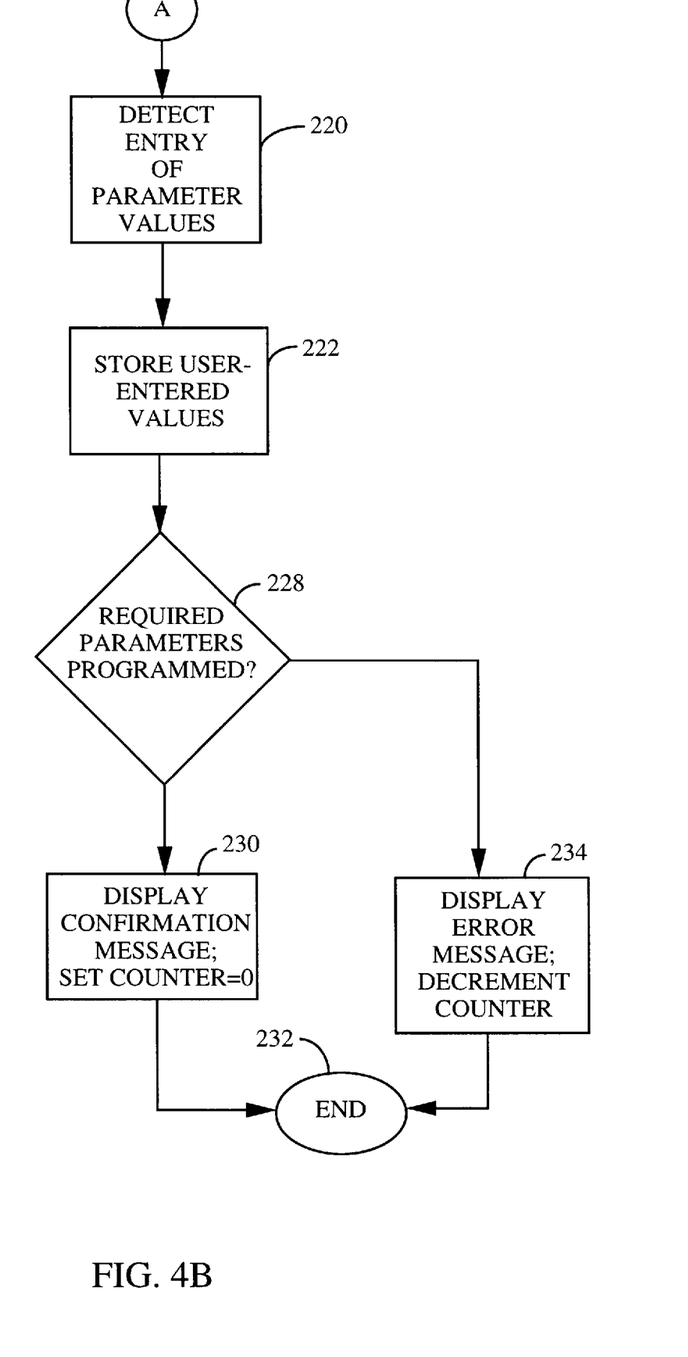

The operation of the cellular telephone 100 is described in further detail in the flowcharts of FIGS. 4A and 4B. At a start 200, shown in FIG. 4A, the user has purchased the cellular telephone 100. In step 202, the user calls the designated telephone number to obtain a password corresponding to the particular cellular telephone 100. As previously stated, the password may alternately be obtained from the packaging of the cellular telephone 100 or from the retail clerk or from other sources. In step 204, the user enters the password using the keypad 20 (see FIG. 2). In step 206, the CPU 108 (see FIG. 2) retrieves the stored password from the password storage area 116 using the pointer 118 if there is more than one password. In decision 208, the CPU 108 determines whether the user entered password matches the stored password. If the user entered password does not match the stored password, the result of decision 208 is NO. In that event, the cellular telephone 100 will not permit the end-user to alter the user-programmable system parameter storage area 130. The cellular telephone 100 may show an optional error message on the display 16 in step 210, moves the pointer to the next password, and ends the programming attempt at 212.

If the user entered password matches the stored password, the result of decision 208 is YES, and the cellular telephone 100 checks to see if the counter for that password has expired at 214. If the counter has reached zero, meaning either that the cellular telephone 100 has already been successfully programmed or that there have been more than the allowable unsuccessful attempts, then the decision 214 is YES, and the optional error message is shown on the display 16 in step 210, the pointer is moved to the next password, and the programming attempt ends at 212. If, however, the counter has not yet expired for that password, then the decision 214 is NO and the cellular telephone 100 displays the current user-programmable parameter values in step 216.

Figure 5:
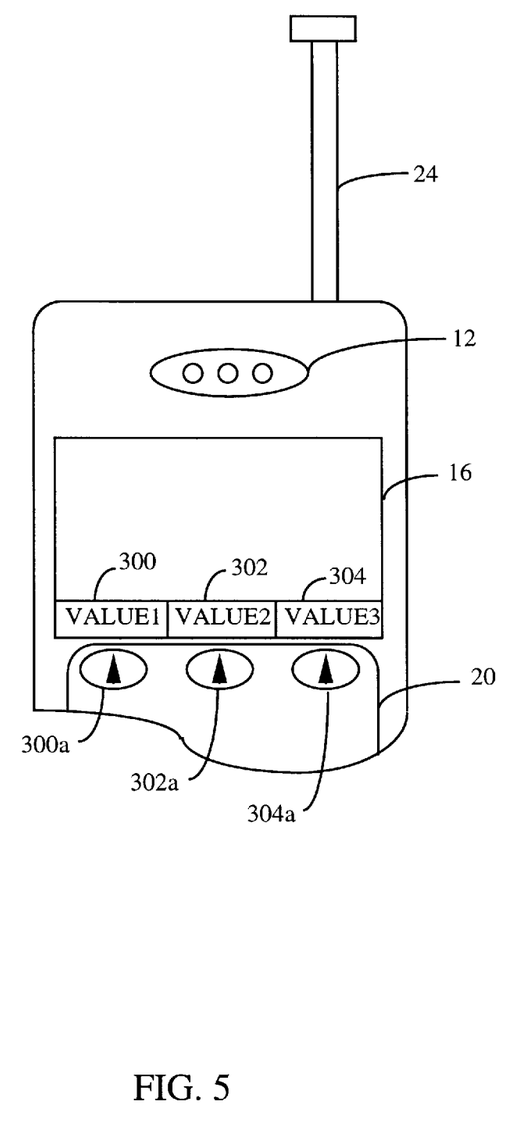
FIG. 5 is a fragmented view of the cellular telephone of FIG. 2 illustrating the selection of user selectable parameters.

It should be noted that the system operation data parameter values may be sequentially displayed on the display 16 to permit the user to select a default parameter value or to program a new parameter value for each of the user-programmable system operational parameters in the NAM storage area 114. In step 220, illustrated in FIG. 4B, the CPU 108 detects user entry of parameter values. The user can enter selected parameter values using keypad 20 to select numerical values. Alternatively, the user can use the keypad 20 in conjunction with the display 16 to select from options shown on the display. This feature is illustrated in FIG. 5 where the display 16 indicates three alternative system parameter values 300, 302, and 304 for a particular system parameter. The user selects the desired parameter value by activating a corresponding key 300a, 302a, or 304a, respectively, on the keypad 20. Other well-known data entry techniques, such as a display with scrolling keys to select a desired parameter value, can also be used by the cellular telephone 100.

Returning again to FIG. 4B, in step 222, the cellular telephone 100 stores the user-entered data values in the user-programmable system parameter storage area 130 (see FIG. 3). If the cellular telephone 100 is used to call the designated telephone number in step 202, the CPU 108 (see FIG. 2) may wait to execute step 222 until after the cellular telephone call is terminated. As discussed above, this permits the call to the designated telephone number to be completed before the NAM storage area 114 is altered, thus preventing possible interruption of the call to the designated telephone number.

In decision 228 the cellular telephone 100 determines whether all required parameters have been programmed. If all required parameters have been programmed, the result of decision 228 is YES and the cellular telephone displays a confirmation message and sets all counters to zero in step 230 and ends the programming process at 232. If all required parameters have not been programmed, the result of decision 228 is NO. In that event, the cellular telephone 100 displays an error message and decrements the counter for the entered password in step 234 and ends the programming process at 232.

Thus, the cellular telephone 100 provides a simple technique for end-user programming of system parameters. Many system parameter values do not change during the useful life of the cellular telephone 100 and can be pre-programmed for the end-user. The remaining system parameters can be programmed by the end-user using instructions supplied with the cellular telephone 100. The password protection of the cellular telephone 100 prevents inadvertent reprogramming and is also a theft deterrent.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

We claim:

1. A system for user-programming of a wireless communication device for operation with a wireless service provider, the system comprising:

a data entry device operable by a user to operate the wireless communication device and to enter a user-entered password and user-entered data;

a parameter storage area for storing system parameter values, said system parameter values controlling communications of the wireless communication device;

a password storage area for storing at least one password;

a password comparator for comparing said user-entered password with said at least one stored password, said password comparator generating an authorization signal if said user-entered password matches said at least one stored password, said authorization signal enabling said system parameter values to be changed in response to said user-entered data, and said password comparator generating an error signal if said user-entered password does not match said stored password; and an attempt counter for storing an allowable attempt count, said attempt counter decrementing said allowable attempt count in response to said error signal, and said attempt counter setting said allowable attempt count to zero in response to said change of said system parameters.

2. The system of claim 1, further including a display device for displaying instructions to the user to assist in user-programming of said system parameter values.

3. The system of claim 1, further including a transceiver for transmitting information from the wireless communication device to the wireless service provider and for receiving information from the wireless service provider, wherein said transceiver establishes a wireless communication with the wireless service provider and, upon generation of said authorization signal by said password comparator, at least some of said system parameter values are downloaded from the wireless service provider during said wireless telephone communication for storage in said parameter storage area, remaining ones of said system parameter values being entered into the wireless communication device by the user using said data entry device.

4. The system of claim 1 wherein said password storage area contains a plurality of passwords, the system further including a data pointer for selecting one of said plurality of passwords.

5. The system of claim 1 wherein said parameter storage area contains first and second portions and said password storage area contains first and second passwords, said password comparator generating a first authorization signal if said user-entered password matches said first stored password and generating a second authorization signal if said user-entered password matches said second stored password.

6. The system of claim 5 wherein said first authorization signal enables user-programming of said system parameter values for storage in said first portion of said parameter storage area and said second authorization signal enables user-programming of said system parameter values for storage in said second portion of said parameter storage area.

7. The system of claim 5 wherein said first authorization signal enables user-programming of said system parameter values for storage only in said first portion of said parameter storage area and said second authorization signal enables user-programming of said system parameter values for storage in both said first and second portions of said parameter storage area.

8. The system of claim 1 wherein the wireless communication device is a cellular telephone containing a number assignment module and said system parameters comprise at least a portion of the number assignment module.

9. The system of claim 1 wherein at least some of said system parameters values are related, the system further including a processor for accepting a user-programmed system parameter value for a first of said related parameter values and for automatically programming remaining ones of said related system parameter values in response to said first related parameter value.

10. The system of claim 1 wherein said attempt counter stores a separate allowable attempt count for each of said at least one passwords.

11. A system for user-programming of a cellular telephone for operation with a cellular service provider via a cell site controller, the system comprising:

a housing containing the cellular telephone;

a transceiver within said housing for transmitting information from the cellular telephone to the cellular service provider via the cell site controller and for receiving information from the cellular service provider via the cell site controller;

a display device coupled to said housing;

a parameter storage area within said housing for storing system parameter values, said system parameters controlling interaction between the cellular telephone and the cellular service provider via the cell site controller, with a predetermined number of said system parameters requiring programming;

a data entry device coupled to said housing and operable by a user for operating the cellular telephone and for entering said system parameter values;

a counter to count a number of programming attempts; and a processor for detecting user entry of said system parameter values and for decrementing said count in response to said entry of said system parameter values.

12. The system of claim 11 wherein the cellular telephone is activated by establishing a cellular communication between the cellular telephone and a remote controller and at least a portion of said programmed system parameter values are downloaded by said remote controller during said communication for storage in said parameter storage area, remaining ones of said programmed system parameter values being entered into the cellular telephone by the user using said data entry device.

13. A user-programmable cellular telephone for operation with a cellular service provider, comprising:

a data entry device operable by a user for entering data into the cellular telephone;

a parameter storage area for storing system parameter values, said system parameter values controlling communications between the cellular telephone and the cellular service provider;

a password storage area for storing a password;

a password comparator for comparing password data entered by the user using said data entry device with said stored password and, if said user-entered password matches said stored password, permitting user-programming of new system parameter values for storage in said parameter storage area;

a counter to count a number of programming attempts; and a processor for detecting user entry of said system parameter values and for decrementing said count in response to said entry of said system parameter values.

14. The cellular telephone of claim 13, further including a transceiver for communicating between the cellular telephone and the cellular service provider wherein said transceiver establishes a cellular telephone communication with the cellular service provider using a predetermined telephone number and, if said user-entered password matches said stored password, at least some of said system parameter values are downloaded from the cellular service provider during said cellular telephone communication for storage in said parameter storage area, remaining ones of said new system parameter values being entered into the cellular telephone by the user using said data entry device.

15. The cellular telephone of claim 13 where in said parameter storage area includes first and second portions and said password storage area contains first and second passwords, said password comparator permitting user-programming of said system parameter values for storage in said first portion if said user-entered password matches said first stored password and permitting user-programming of said system parameter values for storage in said second portion if said user-entered password matches said second stored password.

16. The cellular telephone of claim 13 wherein at least some of said system parameter values are related, and wherein said processor accepts a user-program med system parameter value for a first of said related parameter values and automatically programs remaining ones of said related system parameter values in response to said first related parameter value.

17. The cellular telephone of claim 13 for use with the cellular telephone containing a number assignment module wherein said system parameter values comprise at least a portion of the number assignment module.

18. A method for user-programming of a wireless communication device having a data entry device for operation with a wireless service provider, the method comprising the steps of:

entering a user-entered password and user-entered data using said data entry device;

storing system parameter values, said system parameter values controlling communications of the wireless communication device;

storing at least one password;

comparing said user-entered password with said at least one stored password;

generating an authorization signal if said user-entered password matches said at least one stored password, said authorization signal enabling said system parameter values to be changed in response to said user-entered data;

generating an error signal if said user-entered password does not match said stored password;

storing an allowable attempt count;

decrementing said allowable attempt count in response to said error signal; and     setting said allowable attempt count to zero in response to said change of said system parameters.

19. The method of claim 18, further including the step of displaying instructions to the user to assist in user-programming of said system parameter values.

20. The method of claim 18, further including the steps of:

establishing a wireless communication with the wireless service provider;

downloading, upon said generation of said authorization signal, at least some of said system parameter values from the wireless service provider during said wireless telephone communication;

storing said downloaded system parameter values;

entering remaining ones of said system parameter values into the wireless communication device using said data entry device.

21. The method of claim 18 wherein said step of storing at least one password comprises storing a plurality of passwords, the method further including the step of selecting one of said plurality of stored passwords.

22. The method of claim 18 wherein said step of storing at least one password comprises storing first and second passwords, and wherein said step of generating and authorization signal comprises generating a first authorization signal if said user-entered password matches said first stored password and generating a second authorization signal if said user-entered password matches said second stored password.

23. The method of claim 22 wherein said first authorization signal enables user-programming of said system parameter values for storage in a first portion of a parameter storage area and said second authorization signal permits user-programming of said system parameter values for storage in a second portion of said parameter storage area.

24. The method of claim 22 wherein said first authorization signal enables user-programming of said system parameter values for storage only in a first portion of a parameter storage area and said second authorization signal enables user-programming of said system parameter values for storage in both said first portion and a second portion of said parameter storage area.

25. The method of claim 18 wherein the wireless communication device is a cellular telephone containing a number assignment module and said system parameters comprise at least a portion of the number assignment module.

26. The method of claim 18 wherein at least some of said system parameters values are related, the method further including the steps of:

accepting a user-programmed system parameter value for a first of said related parameter values; and     automatically programming remaining ones of said related system parameter values in response to said first related parameter value.

\* \* \* \* \*